(12) United States Patent
Hara et al.

(10) Patent No.: US 12,495,374 B2
(45) Date of Patent: Dec. 9, 2025

(54) TIME SYNCHRONIZATION NETWORK

(71) Applicant: National Institute of Information and Communications Technology, Tokyo (JP)

(72) Inventors: Motoaki Hara, Tokyo (JP); Yuichiro Yano, Tokyo (JP); Tetsuya Ido, Tokyo (JP)

(73) Assignee: National Institution of Information and Communications Technology, Tokyo (JP)

( * ) Notice: Subject to any disclaimer, the term of this patent is extended or adjusted under 35 U.S.C. 154(b) by 450 days.

(21) Appl. No.: 18/003,528

(22) PCT Filed: Jun. 29, 2021

(86) PCT No.: PCT/JP2021/024442
§ 371 (c)(1),
(2) Date: Dec. 28, 2022

(87) PCT Pub. No.: WO2022/009724
PCT Pub. Date: Jan. 13, 2022

(65) Prior Publication Data
US 2023/0319746 A1    Oct. 5, 2023

(30) Foreign Application Priority Data
Jul. 6, 2020  (JP) ................................ 2020-116728

(51) Int. Cl.
*H04W 56/00*    (2009.01)
(52) U.S. Cl.
CPC ............................. *H04W 56/0015* (2013.01)

(58) Field of Classification Search
None
See application file for complete search history.

(56) References Cited

U.S. PATENT DOCUMENTS

| 2009/0225743 A1* | 9/2009 | Nicholls | ............... | H04W 56/00 |
| | | | | 370/350 |
| 2010/0013712 A1* | 1/2010 | Yano | ..................... | G01S 13/876 |
| | | | | 342/463 |

(Continued)

FOREIGN PATENT DOCUMENTS

| JP | 2011223419 A | 11/2011 |
| JP | 2016057169 A | 4/2016 |
| JP | 2019110417 A | 7/2019 |

OTHER PUBLICATIONS

Cyr et al., "All-Optical Microwave Frequency Standard: A Proposal," IEEE Transactions on Instrumentation and Measurement, 1993, vol. 42, pp. 640-649.

(Continued)

*Primary Examiner* — Nicholas Sloms
(74) *Attorney, Agent, or Firm* — GRUMBLES LAW PLLC; Brittany Haanan

(57) ABSTRACT

A time synchronization network able to efficiently maintain time synchronization according to standard time is described. A communication device includes a time information output unit and a time synchronization unit. The time information output unit is configured to output time information with an internal clock that is stable. The time synchronization unit is configured to correct the time information of the time information output unit based on information on a time difference between the communication device and another communication device adjacent to the communication device.

1 Claim, 7 Drawing Sheets

(56) References Cited

U.S. PATENT DOCUMENTS

| | | | | |
|---|---|---|---|---|
| 2012/0244807 | A1* | 9/2012 | Kuroda | H04W 74/06 |
| | | | | 455/41.2 |
| 2019/0045466 | A1* | 2/2019 | Shiga | G04G 7/02 |
| 2019/0081720 | A1* | 3/2019 | Barry | H04W 56/0015 |
| 2020/0137705 | A1* | 4/2020 | Takeda | H04W 56/0015 |
| 2020/0229124 | A1* | 7/2020 | Soriaga | H04W 4/023 |
| 2020/0314783 | A1* | 10/2020 | Inoue | H04W 56/0065 |
| 2024/0137202 | A1* | 4/2024 | Knowles | H04N 5/06 |

OTHER PUBLICATIONS

International Search Report for corresponding International Application No. PCT/JP2021/024442, mailed Aug. 17, 2021.
Knappe et al., "A Microfabricated Atomic Clock," Applied Physics Letters, 2004, vol. 85, pp. 1460-1462.
Kohri, T., "A Synchronization Network System with Absolute Time for Smart Grid," IEICE Technical Report, 2012, vol. 111, No. 476, pp. 123-128.
Written Opinion for corresponding International Application No. PCT/JP2021/024442, mailed Aug. 17, 2021.

* cited by examiner

TIME SYNCHRONIZATION NETWORK

CROSS-REFERENCE TO RELATED APPLICATIONS

This application is US National Stage of International Patent Application PCT/JP2021/024442, filed Jun. 29, 2021, which claims benefit of priority from Japanese Patent Application JP2020-116728, filed Jul. 6, 2020, the contents of both of which are incorporated herein by reference.

TECHNICAL FIELD

The disclosure relates to a time synchronization network that performs time synchronization of a communication device.

BACKGROUND ART

A telecommunications infrastructure requires robustness and is configured so that communication nodes, such as base stations and relay stations, are installed and disposed to form a layered mesh topology to ensure synchronization. The field of power transmission and distribution places emphasis on efficiency as well as robustness. Smart management is performed by synchronizing the amount of electricity usage with standard time, and feedback to power generation facilities is performed with the aim of optimizing the efficiency of overall electricity use (Patent Literature 1 [Japanese Unexamined Patent Application Publication No. 2019-110417]).

Synchronization is also used to ensure stability and confidentiality of telecommunication. A wireless communication terminal such as a mobile phone performs, as a protocol for establishing communication, synchronization with a base station to which it is to be connected prior to transmitting or receiving packets.

The above-described wireless communication terminal performs a timing adjustment for each communication associated with a communication event that occurs. This synchronization is nothing more than synchronization between communicating wireless communication terminals and is not intended to allow a plurality of systems to share time as with time synchronization using standard time. Time synchronization using standard time is difficult. Due to random frequency drift that exists in an internal clock of a wireless communication terminal, time synchronization can only be maintained for an extremely short period of time.

In recent years, miniaturization of atomic clocks that utilize energy levels of an alkali metal element such as Cesium (Cs) or Rubidium (Rb) has rapidly progressed (Non-patent Literature 1 [N. Cyr, M. Tetu, M. Breton, "All-Optical Microwave Frequency Standard: A Proposal," IEEE Transactions on Instrumentation and Measurement, vol. 42, pp. 640-649, 1993] and non-patent Literature 2 [S. Knappe, V. Shar, P. Schwindt, L. Hollberg, J. Kitching, L. A. Liew, J. Moreland, "A Microfabricated Atomic Clock," Applied Physics Letters, vol. 85, pp. 1460-1462, 2004]). Through applying such a small-sized atomic clock, frequency drift of an internal clock that is installed in a wireless communication terminal will be able to be suppressed significantly. Furthermore, even when frequency drift does occur, because a constant drift rate can be maintained, the frequency drift will be able to be corrected easily using linear interpolation.

Communication using a conventional wireless communication terminal involves transmission and reception of packets between a base station and a terminal. There is a constant demand for an increase in the amount of data that may be handled in and in operation speed of data. If time synchronization can be maintained in a stable manner with the above-described small-sized atomic clock, aggregation of big data, advanced arithmetic processing, and advanced information extraction will become realizable through coordination and virtualization of terminals or of a base station and a terminal.

With a rapid increase in the number of wireless communication terminals that connect to a network, the frequency of time synchronization by a time server has risen to a level that can no longer be considered insignificant in terms of communication traffic. Furthermore, due to an increasing scale of a network, indeterminate network delay during time synchronization is becoming harder to ignore.

SUMMARY

A time synchronization network according to a first aspect of the invention is a time synchronization network for performing time synchronization of a plurality of communication devices that are connected thereto. Each of the plurality of communication devices includes a communication function. Each communication device includes a time information output unit and a time synchronization unit. The time information output unit is configured to output time information with an internal clock that is stable. The time synchronization unit is configured to correct the time information based on time difference information on a time difference between the communication device and another communication device adjacent to the communication device.

DESCRIPTION OF EMBODIMENTS

Embodiments of the invention will be described with reference to the drawings. Individual embodiments described below are intended to embody a technical idea of an aspect the invention. The invention is not limited to these embodiments unless specifically stated otherwise. Same components are assigned the same reference signs in embodiments and repeat description thereof may be omitted.

Overall Configuration of Network

Figure 1:
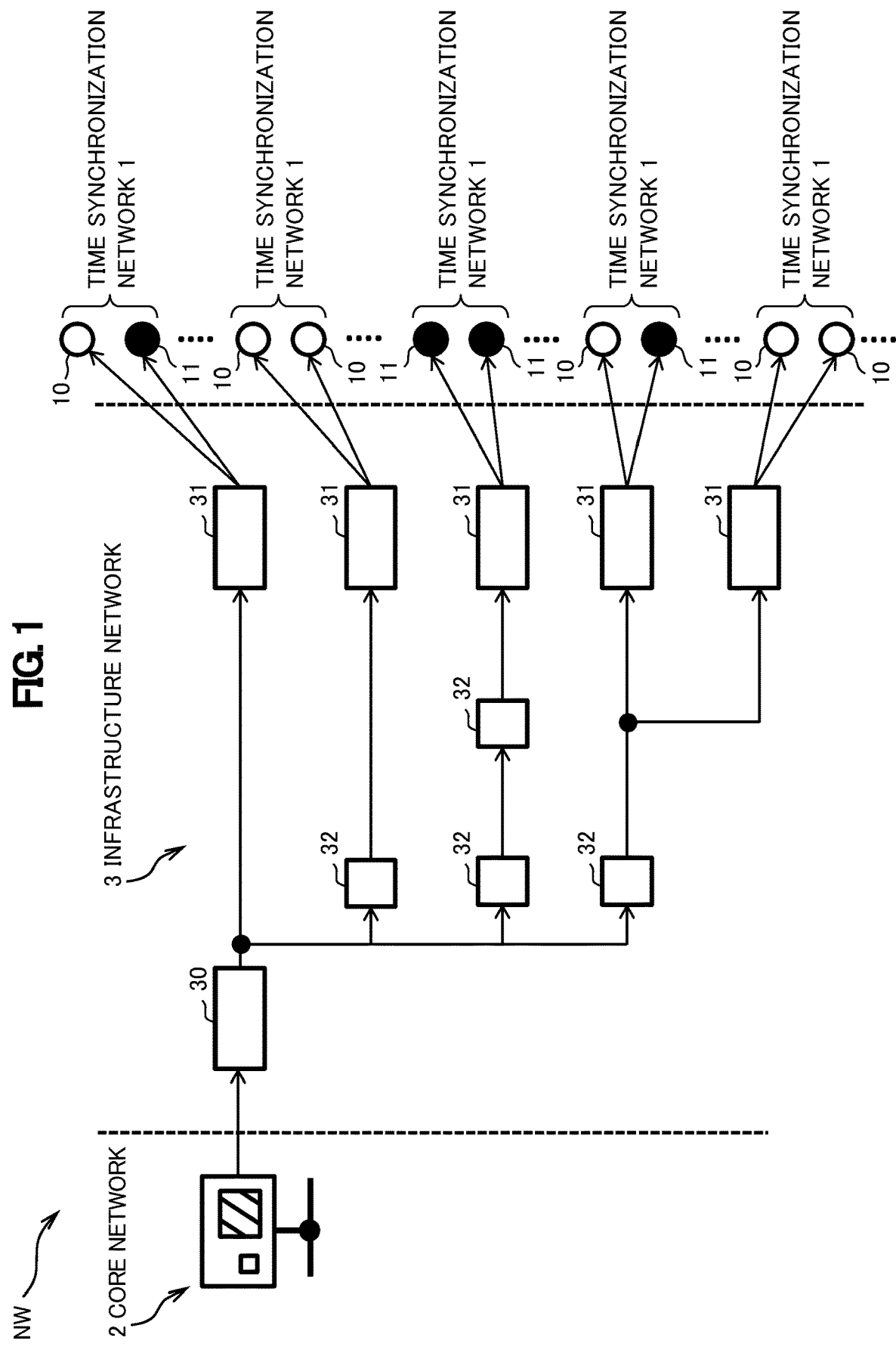
FIG. 1 is an illustration of an overall configuration of a network.

An overall configuration of a network NW will be described, as a premise of embodiments, with reference to FIG. 1.

The network NW forms a time synchronous telecommunication network. As shown in FIG. 1, the network NW includes a time synchronization network 1, which will be described later, a core network 2, and an infrastructure network 3.

The core network 2 is a core telecommunication network that is capable of high-capacity communication. The core network 2 may also be referred to as a backbone.

The infrastructure network 3 is a network that connects the time synchronization network 1 and the core network 2. The infrastructure network 3 is configured so that it branches off to the time synchronization network 1. A connection between the infrastructure network 3 and a time synchronization network 1 may be a wired or wireless connection. For example, the infrastructure network 3 includes: a base station (parent-station device) 30 that is connected to a core network 2; and a base station (child-station device) 31 that is connected to a time synchronization network 1. Furthermore, the infrastructure network 3 may include a repeater (relay device) 32 that relays a signal between a base station 30 a base station 31.

In such a network NW, time information that is time synchronous and accurate reaches a time synchronization network 1 by being transmitted from a core network 2 to a base station 30, relayed by a repeater 32, and passed through a base station 31. This time synchronization network 1 includes an edge server 10 having a computing capability and a large number of communication devices 11 that are connected to the edge server 10. Time synchronization of the time synchronization network 1 is efficiently maintained as will be described below.

First Embodiment

Configuration of Time Synchronization Network

A configuration of a time synchronization network 1 according to a first embodiment will be described with reference to FIG. 2.

Figure 2:
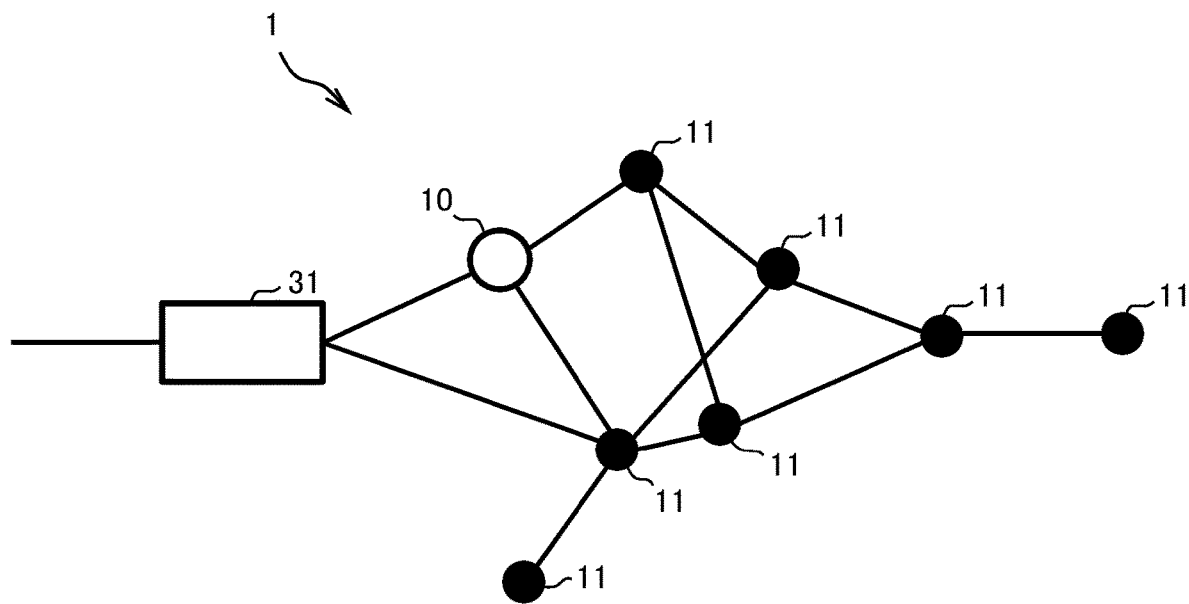
FIG. 2 shows a configuration of a sparse network that is a time synchronization network according to a first embodiment.
Figure 3:
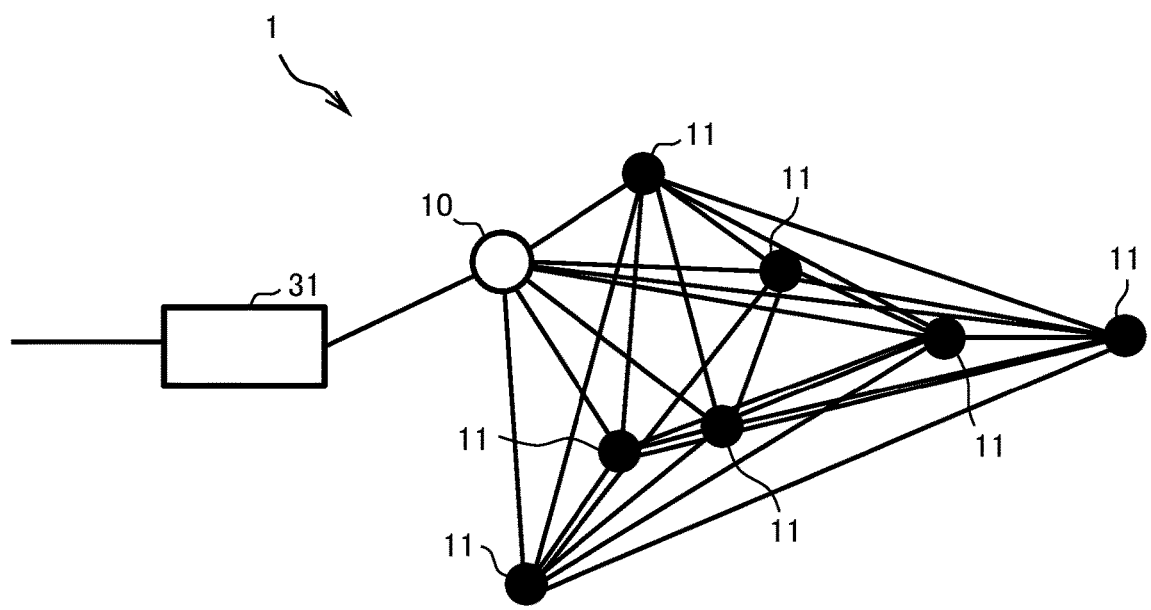
FIG. 3 shows a configuration of a dense network that is a time synchronization network according to the first embodiment.

As shown in FIG. 2, the time synchronization network 1 includes an edge server 10 and communication devices 11. The time synchronization network 1 performs time synchronization of individual communication devices 11. The time synchronization network 1 of FIG. 2 is a sparse network in which the edge server 10 and the communication devices 11 are connected only to an adjacent communication device 11. The time synchronization network 1 may, as shown in FIG. 3, be a dense network in which the edge server 10 and the communication devices 11 are connected to one another. In the following description, it is assumed that the time synchronization network 1 is a sparse network.

The edge server 10 is a general edge server that is used in edge computing. The edge server 10 is configured to perform desired processing of various data received from the communication device 11 and transmits the processed data to a core network 2. The edge server 10 is connected to a base station 31 and to at least one communication device 11. In the example of FIG. 2, the edge server 10 is connected to two communication devices 11. In the present embodiment, the edge server 10 also includes a function as a time server that provides standard time to a communication device 11.

The communication device 11 is any device that includes a communication function. The communication device 1 may also be referred to as a communication node. For example, a communication device 11 may be a wireless communication terminal such as a mobile phone or a smart phone. The communication device 11 is not limited to a wireless communication terminal. A communication device 11 may be a vehicle or a drone that includes a wireless communication function, a sensor terminal that form a sensor network, or a smart meter that measures power consumption.

In a case where a communication device 11 is highly mobile, such as a vehicle or drone, time synchronization is needed so that a plurality of edge servers 10 may work in a coordinated manner. In a case where image data from a plurality of drones are analyzed, contour extraction from image data and obstacle avoidance are executed in real time while executing mobility and data coordination at the same time. These arithmetic processing need to be coordinated between edge servers 10, and, to achieve this, accurate time information is required. In a case of a sensor network in which measurements are taken using a plurality of sensor terminals, continuous and multipoint time synchronization is needed to make the measurement data meaningful.

Configuration of Communication Device

A configuration of a communication device 11 will be described with reference to FIG. 4.

Figure 4:
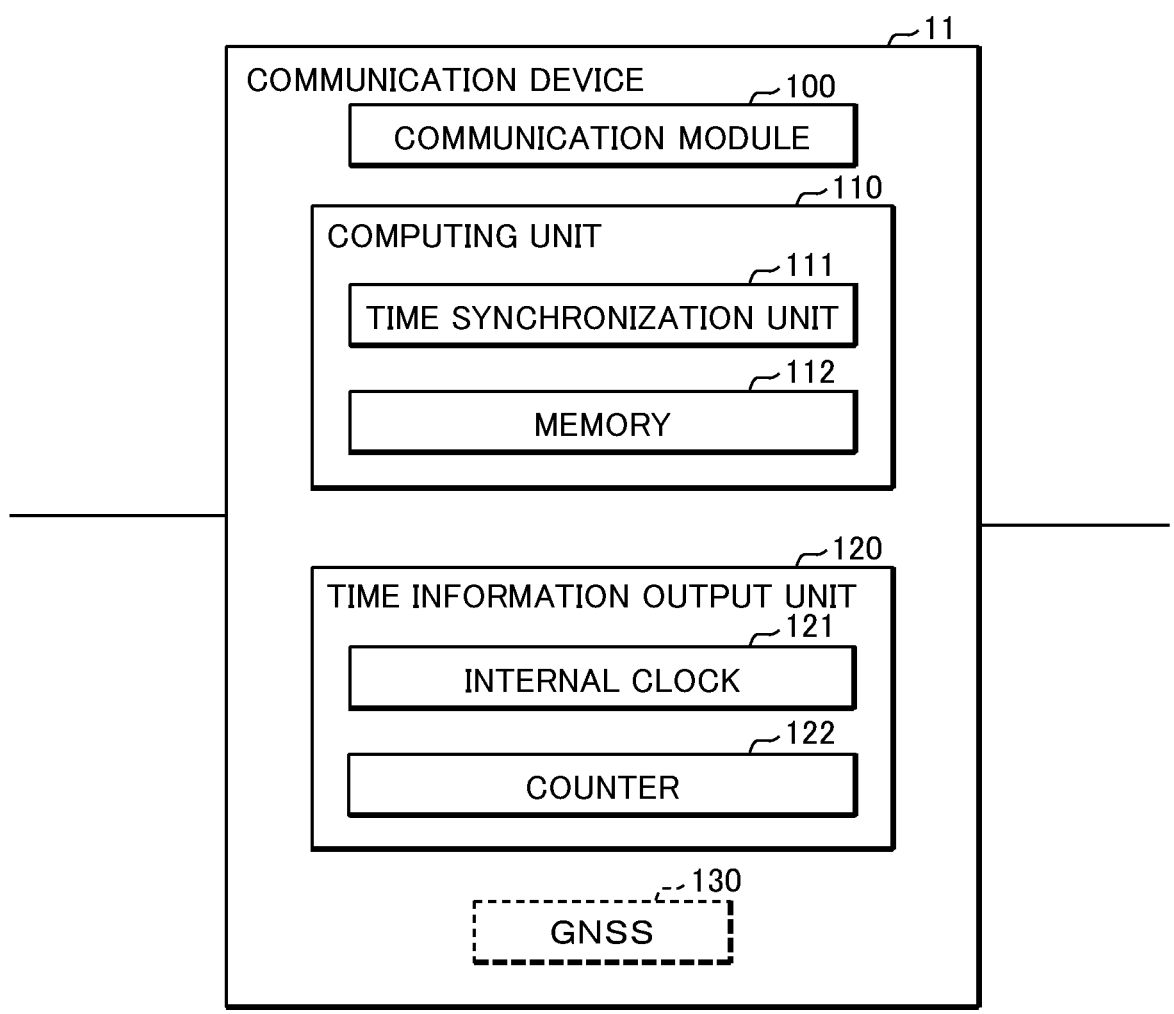
FIG. 4 is a block diagram showing a configuration of a communication device according to the first embodiment.

As shown in FIG. 4, the communication device 11 includes a communication module 100, a computing unit 110, a time information output unit 120, and a GNSS 130.

Note that each communication device 11 of the time synchronization network 1 includes the same configuration.

The communication module 100 realizes a communication function of the communication device 11. More specifically, the communication module 100 is configured to perform communication with an edge server 10 and with another communication device 11. The communication module 100 may use any communication method that is in accordance with a type or purpose of the communication device 11. For example, the communication module 100 may use wireless communication such as Bluetooth (registered trademark) or Wi-Fi (registered trademark). When the communication device 11 is a smartphone, a data communication function of the smartphone may be used as the communication module 100. The communication device 11 may perform communication via a cable.

The computing unit 110 is configured to perform various operations of the communication device 11. The computing unit 110 includes a central processing unit (CPU), read only memory (ROM), and random access memory (RAM). As shown in FIG. 4, the computing unit 110 includes a time synchronization unit 111 and a memory (storage) 112.

The time synchronization unit 111 is configured to correct time information that the time information output unit 120 outputs (which will be described later) based on time difference information that is stored in the memory 112. Details of time synchronization by the communication device 11 will be described later.

The memory 112 is configured to store time difference information. The time difference information indicates a time difference between the communication device 11 and another communication device 11 that is adjacent to the communication device 11. When the communication device 11 is adjacent to an edge server 10, the time difference information indicates a time difference between said communication device 11 and the edge server 10.

The time information output unit 120 includes an internal clock 121 and a counter 122 and is configured to output time information that is based on the internal clock 121. The internal clock 121 is a stable internal clock.

The internal clock 121 is a frequency source configured to generate a clock signal.

The counter 122 is configured to count the clock signal generated by the internal clock 121 to generate the time information.

In the present embodiment, the time information output unit 120 includes an atomic clock. For example, the time information output unit 120 is configured from an atomic clock that utilizes energy levels of an alkali metal element such as Cesium or Rubidium (Non-patent Literatures 1 and 2).

The atomic clock stabilizes the internal clock by utilizing an absorption/emission spectrum defined by a unique energy level that is based on an electron orbit of an atom, a molecule, or the like. Since frequency depends on the energy level of an atom or molecule and the energy level is an intrinsic, physical quantity, an extremely stable frequency standard can be provided. By stabilizing a clock chip such as a crystal oscillator using the above-described technology of the atomic clock, frequency drift can be suppressed significantly. Even when frequency drift occurs, it is possible to maintain a drift rate that is at a constant level, at which linear interpolation may be carried out with ease. Therefore, by configuring the time information output unit 120 from an atomic clock, time synchronization may be maintained through a simple processing based on intermittent, mutual comparison.

The time information output unit 120 is not limited to being configured from an atomic clock. The time information output unit 120 may be configured using a device that includes a corrective function for frequency stabilization. For example, the time information output unit 120 may be configured from a crystal oscillator with a temperature-controlled chamber.

The GNSS 130 is a Global Navigation Satellite System (GNSS) receiver that is configured to measure the location of the communication device 11. For example, position data that is measured by the GNSS 130 is transmitted to the edge server 10 via the communication module 100. The communication device 11 may or may not include the GNSS 130. The communication device 11 includes the GNSS 130 when the communication device 11 is a vehicle or a drone.

It should be understood that the communication device 11 is not limited to the configuration of FIG. 4. For example, when the communication device 11 is a sensor terminal, the communication device 11 may include a sensor such as a laser sensor, an infrared sensor, or an acceleration sensor and furthermore be configured to transmit measurement data of the sensor to the edge server 10. For example, when the communication device 11 is a smart meter, the communication device 11 may include a means to measure electric power consumption and be configured to transmit measured electric power data to the edge server 10.

Time information that is outputted by the time information output unit 120 may be used in any way. For example, the time information may be used for time synchronization in the time synchronization network 1. For example, the time information may be used as a time stamp and added onto position data, image data, measurement data, or power data that the communication device 11 outputs.

Time Synchronization of Time Synchronization Network

Time synchronization of the time synchronization network 1 will be described with reference to FIG. 5.

The time synchronization network 1 does not use a method in which each communication device 11 makes an inquiry about time to an edge server 10 using a communication protocol. Instead, the time synchronization network 1 adopts a method of performing time synchronization based on time difference information between adjacent communication devices 11. With this method, only the communication device 11 adjacent to an edge server 10 makes an inquiry about time to the edge server 10. With this method, therefore, a communication device 11 not adjacent to the edge server 10 does not connect to the edge server 10, and communication traffic can be suppressed.

Here, the edge server 10 may periodically execute a time synchronization event. The time synchronization event is an event that instructs individual communication devices 11 to perform time synchronization and serves as a trigger for time synchronization.

The edge server 10 may execute a time synchronization event according to a synchronization request from a communication device 11.

Upon receiving a time synchronization event, the communication device 11 performs time synchronization.

With only the above-described time difference information, it is not clear which one of two adjacent communication devices 11 has more accurate time information. And because of this, time information to be used as a reference cannot be determined. Therefore, the time synchronization network 1 uses an inquiry step number n to determine time information that is used as a reference. The inquiry step number n indicates the number of times an inquiry about time information has been made. The inquiry step number n is illustrated in FIG. 5 with a dashed arrow. The dashed arrow indicates a path of inquiry about time information in the time synchronization network 1. In this way, a virtual, layered structure of the inquiries is formed for the time synchronization network 1. A communication device 11 whose inquiry step number n is larger corrects its time information using, as a reference, time information of a communication device 11 whose inquiry step number n is smaller.

Figure 5:
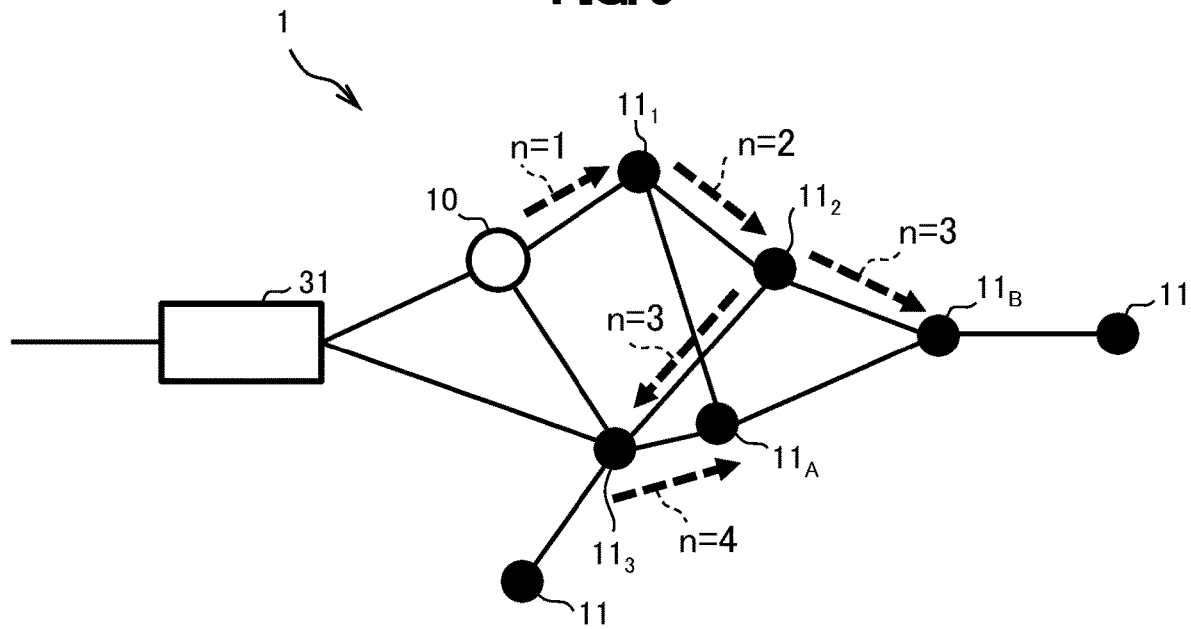
FIG. 5 is an explanatory diagram for describing time synchronization of a time synchronization network according to the first embodiment.

It goes without saying that the path of inquiry shown in FIG. 5 is just one example, and the path of inquiry is not limited thereto.

As shown in FIG. 5, the inquiry step number n for the communication device $11_1$ that makes an inquiry about time information to the edge server 10 is 1 (n=1). In other words, the inquiry step number n is 1 for a communication device $11_1$ that is adjacent to the edge server 10 and belongs to a first layer. The inquiry step number n for the communication device $11_2$ that makes an inquiry about time information to the communication device $11_1$ is 2 (n=2). In other words, the inquiry step number n is 2 for a communication device $11_2$ that is adjacent to the communication device $11_1$ and belongs to a second layer.

To be more specific, when, through its time synchronization unit $11_1$, the communication device $11_1$ of the first layer makes an inquiry about time information $t_0$ to the edge server 10, the communication device $11_1$ receives the time information $t_0$ from the edge server 10 in response to the inquiry. Then, through its time synchronization unit 111, the communication device $11_1$ obtains a difference between the time information $t_0$ of the edge server 10 and time information $t_1$ of its time information output unit 120 and stores the difference in its memory 112 as time difference information $\Delta t_{01}$. Through its time synchronization unit 111, the communication device $11_1$ also stores the inquiry step number n, which is equal to 1, in its memory 112 with the time difference information $\Delta t_{01}$. Then, through its time synchronization unit 111, the communication device $11_1$ corrects the time information $t_1$ of its time information output unit 120 by offset processing that is based on the time difference information $\Delta t_{01}$ stored in its memory 112 ($t_1=t_0+\Delta t_{01}$). The offset processing is a process whereby the time information $t_1$ of the time information output unit 120 is shifted by the time difference information $\Delta t_{01}$ that has been stored in the memory 112.

When, through its time synchronization unit 111, the communication device $11_2$ of the second layer makes an inquiry about time information $t_1$ to the adjacent communication device $11_1$, the communication device $11_2$ receives the time information $t_1$ and the inquiry step number n of 1 (n=1) of the communication device $11_1$ in response to the inquiry. Then, through its time synchronization unit 111, the communication device $11_2$ calculates the inquiry step number n of the communication device $11_2$ by adding 1 to the inquiry step number n of the communication device $11_1$. The inquiry step number n of the communication device $11_2$ is calculated to be equal to 2 (n=2). Furthermore, through its time synchronization unit 111, the communication device $11_2$ obtains a difference between the time information $t_1$ of the communication device $11_1$ and time information $t_2$ of its time information output unit 120 and stores the difference in its memory 112 as time difference information $\Delta t_{12}$. Through its time synchronization unit 111, the communication device $11_2$ also stores the inquiry step number n of 2 (n=2) in its memory 112 with the time difference information $\Delta t_{12}$. Then, through its time synchronization unit 111, the communication device $11_2$ corrects the time information $t_2$ of its time information output unit 120 by offset processing that is based on the time difference information $\Delta t_{12}$ stored in its memory 112 ($t_2=t_1+\Delta t_{12}$).

Consider a case where the communication devices 11A and 11B of FIG. 5 perform time synchronization. In the given case, it is assumed that an inquiry about time information is made along the paths that join the edge server 10, the communication device $11_1$ of the first layer, the communication device $11_2$ of the second layer, and either of the communication devices $11_3$ and $11_B$ of a third layer. In this case, since the inquiry step number n of the communication device $11_A$ is 4 (n=4) and the inquiry step number n of the communication device $11_B$ is 3 (n=3), time information $t_A$ of the communication device $11_A$ is corrected using time information $t_B$ of the communication device $11_B$ as reference. In this case, the time information $t_A$ of the communication device $11_A$ is time obtained by offsetting the time information $t_A$ by time difference information $\Delta t_{AB}$, which is the time difference between the communication devices $11_A$ and $11_B$ ($t_A=t_B+\Delta t_{AB}$).

In this way, by having communication devices 11 each perform time synchronization autonomously with an adjacent communication device 11 repeatedly, the time synchronization network 1 may maintain time synchronization in a stable and efficient manner.

Operation of Communication Device

An operation of a communication device 11 will be described with reference to FIG. 6.

Figure 6:
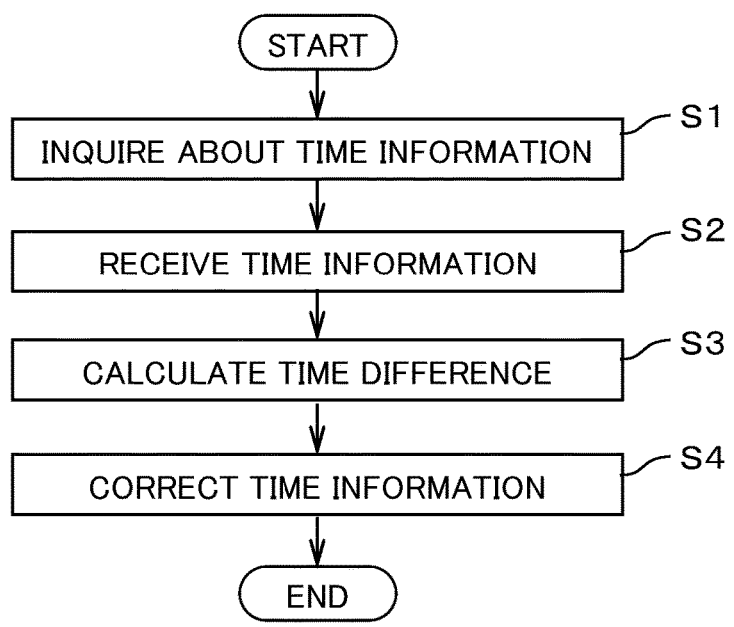
FIG. 6 is a flowchart showing an operation of a communication device according to the first embodiment.

As shown in FIG. 6, in step S1, the time synchronization unit 111 of the communication device 11 makes an inquiry about time information to another communication device 11 that is adjacent to the communication device 11.

In step S2, the time synchronization unit 111 receives time information from the other communication device 11 that is adjacent to the communication device 11 in response to the inquiry of step S1.

In step S3, the time synchronization unit 111 obtains a difference between time information of the time information output unit 120 of the communication device 11 and the time information received in step S2 and stores the difference in the memory 112 of the communication device 11 as time difference information.

In step S4, the time synchronization unit 111 corrects the time information of the time information output unit 120 by offset processing that is based on the time difference information stored in the memory 112.

Operation and Effect

Because the internal clock 121 of the terminal device 11 is stable (as described above), the time synchronization network 1 is able to suppress frequency drift and, even when frequency drift does occur, is able to maintain a constant drift rate. Therefore, in the time synchronization network 1, since time information may be corrected based on the time difference information between adjacent communication devices 11, not all the communication devices 11 have to connect to the edge server 10. Because of this, the time synchronization network 1 is able to suppress communication traffic and network delay and efficiently maintain time synchronization according to standard time.

In cases where the internal clock is unstable, such as when a conventional crystal oscillator is used, disturbances such as external vibration, temperature disturbance, and humidity disturbance will affect individual devices. Random frequency drift will be generated in the devices, and their drift rates will not be able to be maintained at a constant level. In such cases, time information of individual devices will shift separately, and it will be difficult to correct the time information using the time difference information between adjacent devices.

In the time synchronization network 1, since the time information output unit 120 includes an atomic clock, this enables the internal clock to be more stable and frequency drift to be suppressed significantly.

In the time synchronization network 1, since each communication device 11 stores the time difference information in its memory 112, the communication devices 11 do not obtain the time difference information from an external device, enabling communication traffic to be suppressed further.

Second Embodiment

Configuration of Time Synchronization Network

Figure 7:
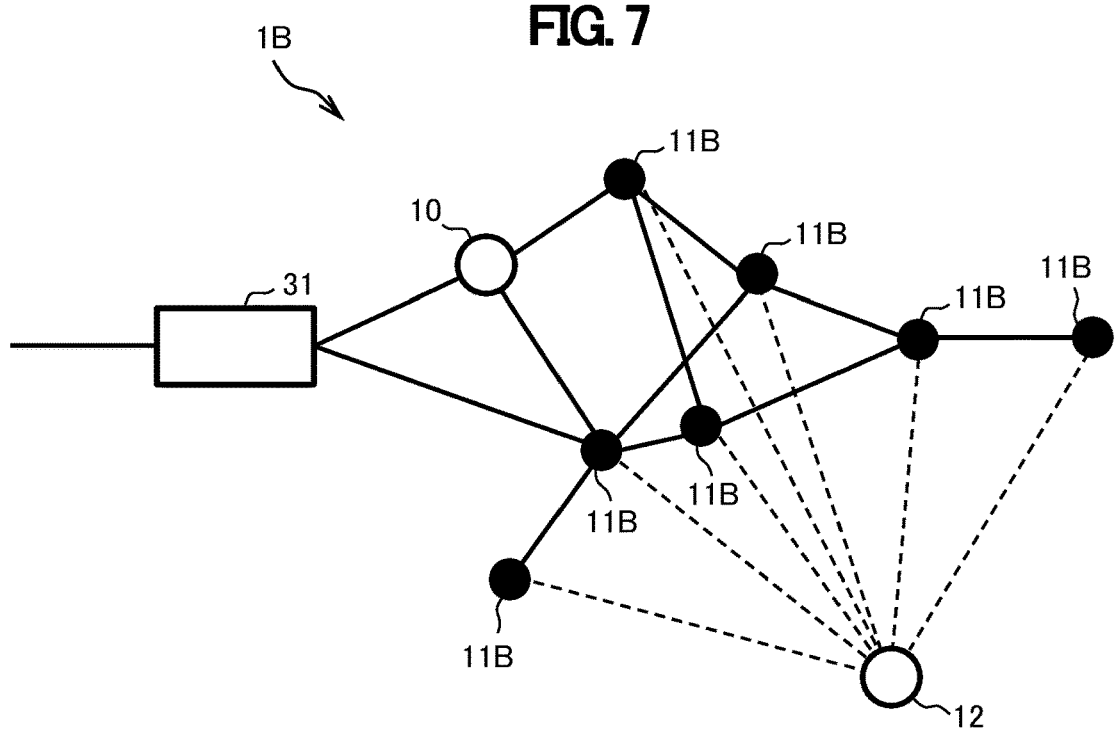
FIG. 7 is a diagram showing a configuration of a time synchronization network according to a second embodiment.

A configuration of a time synchronization network 1B according to a second embodiment will be described with reference to FIG. 7 by describing points that are different to the first embodiment.

The time synchronization network 1B differs from the first embodiment in that a memory server 12 is configured to store the time difference information of individual communication devices 11. As shown in FIG. 7, the time synchronization network 1B includes an edge server 10, a communication device 11B, and a memory server 12. In the description that follows, the memory server 12 will be described prior to describing a configuration of the communication device 11B.

The memory server 12 is configured to store time difference information of each communication device 11B. Accordingly, the memory server 12 includes a memory (not shown) for storing the time difference information. Note that the time difference information itself is the same information as that of the first embodiment.

Configuration of Communication Device

The configuration of the communication device 11B will be described with reference to FIG. 8.

Figure 8:
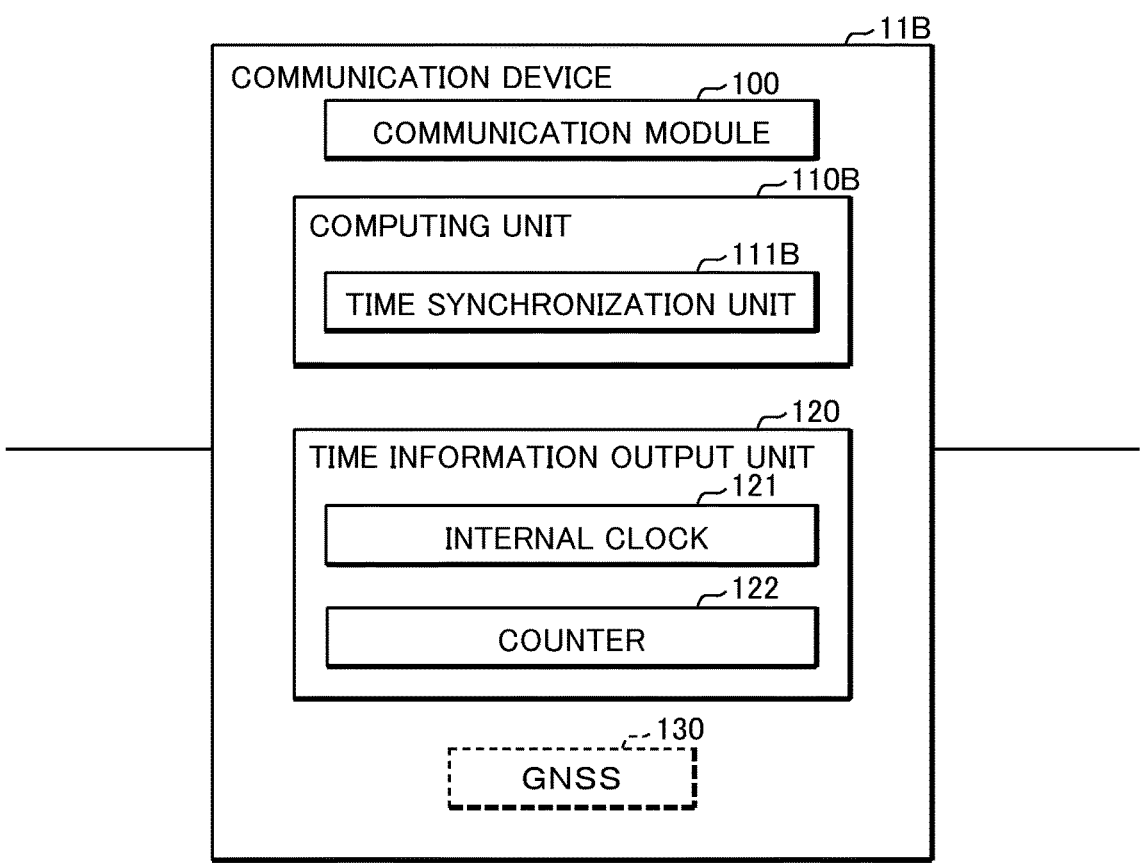
FIG. 8 is a block diagram showing a configuration of a communication device according to a second embodiment.

As shown in FIG. 8, the communication device 11B includes a communication module 100, a computing unit 110B, a time information output unit 120, and a GNSS 130. Since components other than the computing unit 110B are the same as those of the first embodiment, description thereof will be omitted.

While the computing unit 110B includes a time synchronization unit 111B, it does not include a memory 112 (FIG. 4) because it does not store time difference information.

The time synchronization unit 111B is configured to correct time information that the time information output unit 120 outputs by offset processing that is based on the time difference information stored in the memory server 12. The time synchronization unit 111B is the same as that of the first embodiment apart from the time synchronization unit 111B using the time difference information of the memory server 12 instead of the time difference information of the memory 112. Further description of the time synchronization unit 111B is thus omitted.

Operation and Effect

As described above, the time synchronization network 1B is able to suppress communication traffic and network delay and efficiently maintain time synchronization according to standard time in the same way as the first embodiment.

Furthermore, because individual communication devices 11B do not store the time difference information, the time synchronization network 1B is able to simplify the configuration of the communication device 11B and manage the time difference information easily.

Third Embodiment

Configuration of Time Synchronization Network

A configuration of a time synchronization network 1C according to a third embodiment will be described with reference to FIG. 9 by describing points that are different to the first embodiment.

The time synchronization network 1C differs from the first embodiment in that an edge server 10C does not function as a time server and thus a reference communication device (a standard time estimation device) 13 is set up. As shown in FIG. 9, the time synchronization network 1C includes an edge server 10C, a communication device 11, and a reference communication device 13.

Apart from not including a function as a time server, the edge server 10C is the same as that of the first embodiment. In other words, the edge server 10C is a general edge server.

In the time synchronization network 1C, since there is no time server that provides standard time, standard time is estimated by a communication device 11, which may be any of the communication devices 11 within the time synchronization network 1C. A communication device 11 that estimates standard time is referred to as a reference communication device 13. For example, standard time is estimated in the time synchronization network 1C by performing a maximum likelihood point estimation process using a Kalman filter on the time difference information of communication devices 11. In the time synchronization network 1C, any communication device 11 may be set to be the reference communication device 13. In the example of FIG. 9, a communication device 11 adjacent to the edge server 10C is set as the reference communication device 13. Alternatively, a communication device 11 that is not adjacent to the edge server 10C may be set as the reference communication device 13.

In other words, in the time synchronization network 1C, a reference communication device 13 is set as a communication device 11 that serves as a parent. Using the reference communication device 13 as a starting point, time difference information is connected to perform time synchronization. When doing so, the reference communication device 13 calculates virtual standard time so that an amount of time adjustment of each communication device 11 is minimized. A synchronization event may periodically be executed with the reference communication device 13 used as a starting point.

A communication device 11 adjacent to the reference communication device 13 corrects its time information by offset processing that is based on the time difference information between said communication device 11 and the reference communication device 13. That is, when the time synchronization unit 111 of said communication device 11 makes an inquiry about time information to the reference communication device 13, said communication device 11 receives the time information from the reference communication device 13 in response to the inquiry. In other respects, the communication device 11 of the third embodiment is the same as that of the first embodiment, and description thereof will be omitted.

Configuration of Reference Communication Device

Figure 10:
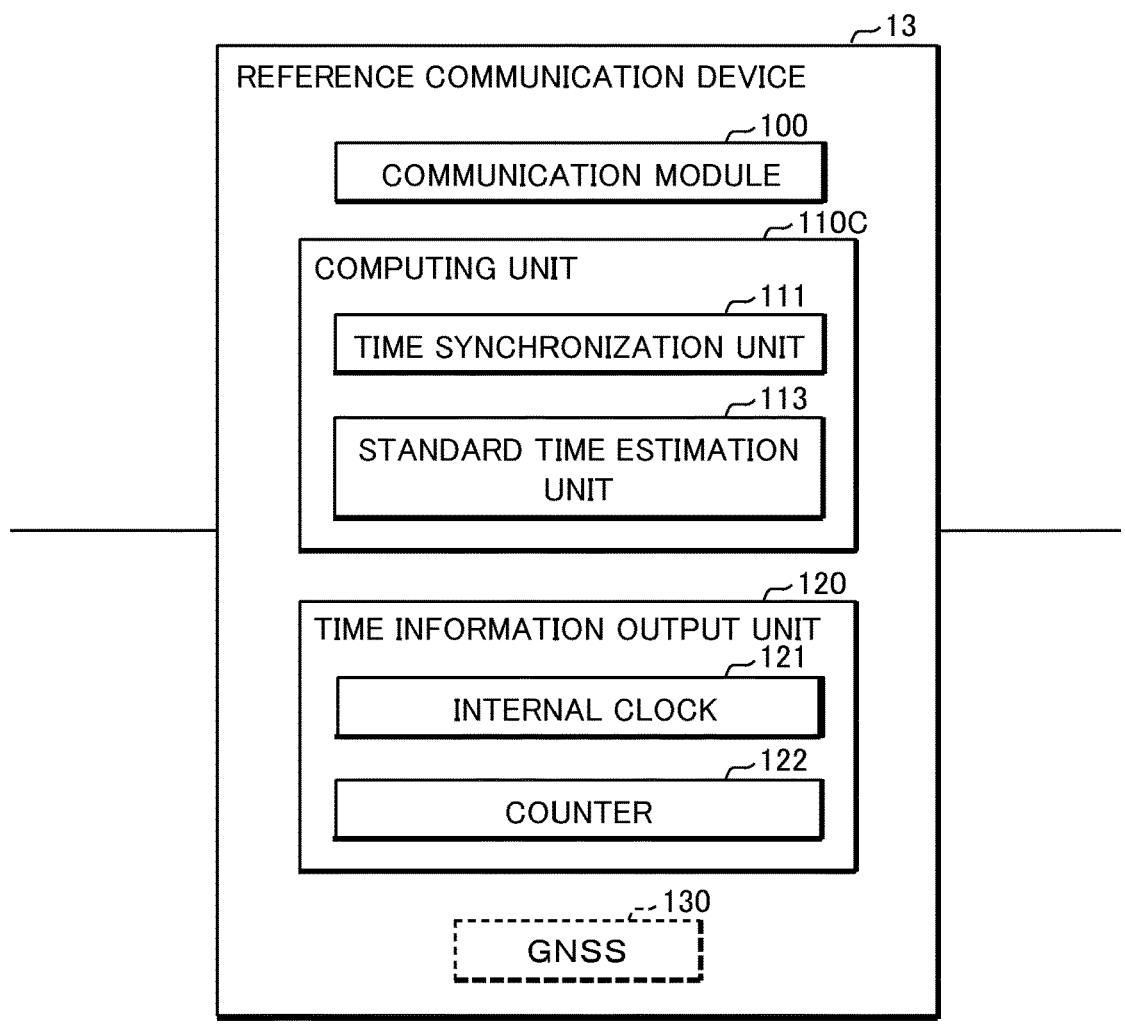
FIG. 10 is a block diagram showing a configuration of a communication device according to a third embodiment.

A configuration of the reference communication device 13 will be described with reference to FIG. 10.

In addition to a function as a communication device 11 as described above, the reference communication device 13 includes a function of estimating standard time. As shown in FIG. 10, the reference communication device 13 includes a communication module 100, a computing unit 110C, a time information output unit 120, and a GNSS 130.

The computing unit 110C includes a time synchronization unit 111 and a standard time estimation unit 113.

The time synchronization unit 111 of the third embodiment is the same as that of the first embodiment, and description thereof will be omitted.

The standard time estimation unit 113 is configured to estimate standard time by statistical processing of time difference information.

First, the standard time estimation unit 113 obtains time difference information from a communication device 11. When doing so, the standard time estimation unit 113 may obtain time difference information from all the communication devices 11. Alternatively, when there are a large number of communication devices 11, the standard time estimation unit 113 may obtain time difference information from an adjacent communication device 11 only. By obtaining time difference information from an adjacent communication device 11 only, it is possible for the standard time estimation unit 113 to suppress an error caused by transmission noise.

Next, the standard time estimation unit 113 performs statistical processing of the obtained time difference information. Here, the standard time estimation unit 113 may perform a simple method of least squares as the statistical processing. Alternatively, the standard time estimation unit 113 may perform a method of least squares with a weight according to a performance (e.g., an operation speed, an error in time information) of each communication device 11. In other words, the standard time estimation unit 113 may perform a method of weighted least squares. When performing the statistical processing, the standard time estimation unit 113 may use a Kalman filter so that noise is sufficiently removed and time difference information is statistically processed as digital information without deterioration. With such a procedure, standard time may be estimated.

Operation and Effect

As described above, the time synchronization network 1C is able to suppress communication traffic and network delay and efficiently maintain time synchronization according to standard time in the same way as the first embodiment.

Furthermore, the time synchronization network 1C is able to accurately perform time synchronization based on standard time estimated by the reference communication device 13 when the time synchronization network 1C does not include a time server.

Figure 9:
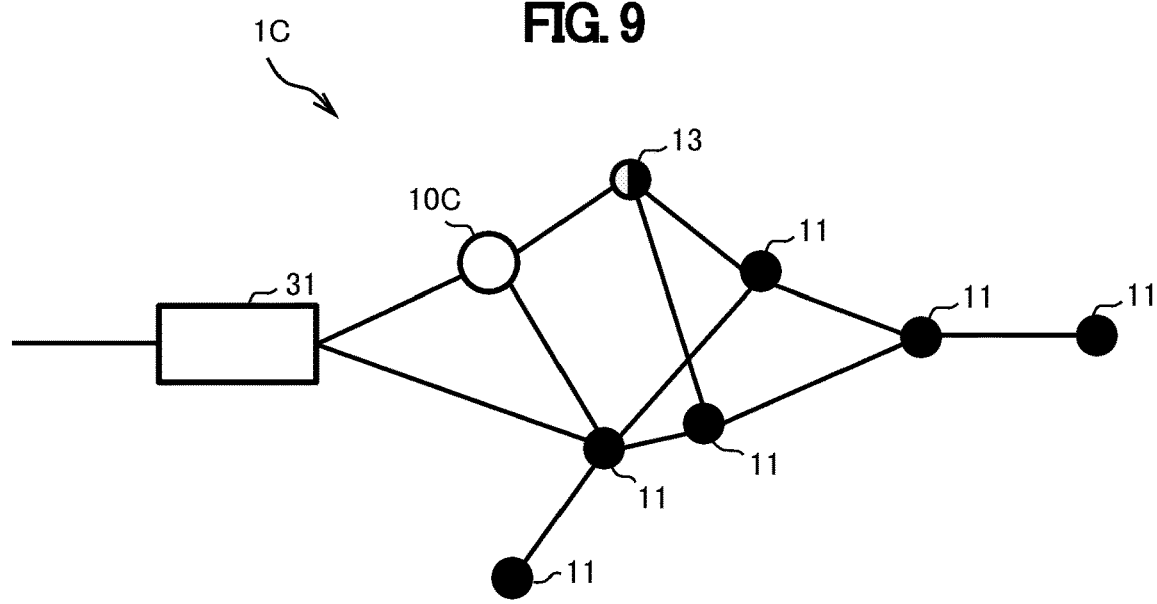
FIG. 9 is a diagram showing a configuration of a time synchronization network according to a third embodiment.
Figure 11:
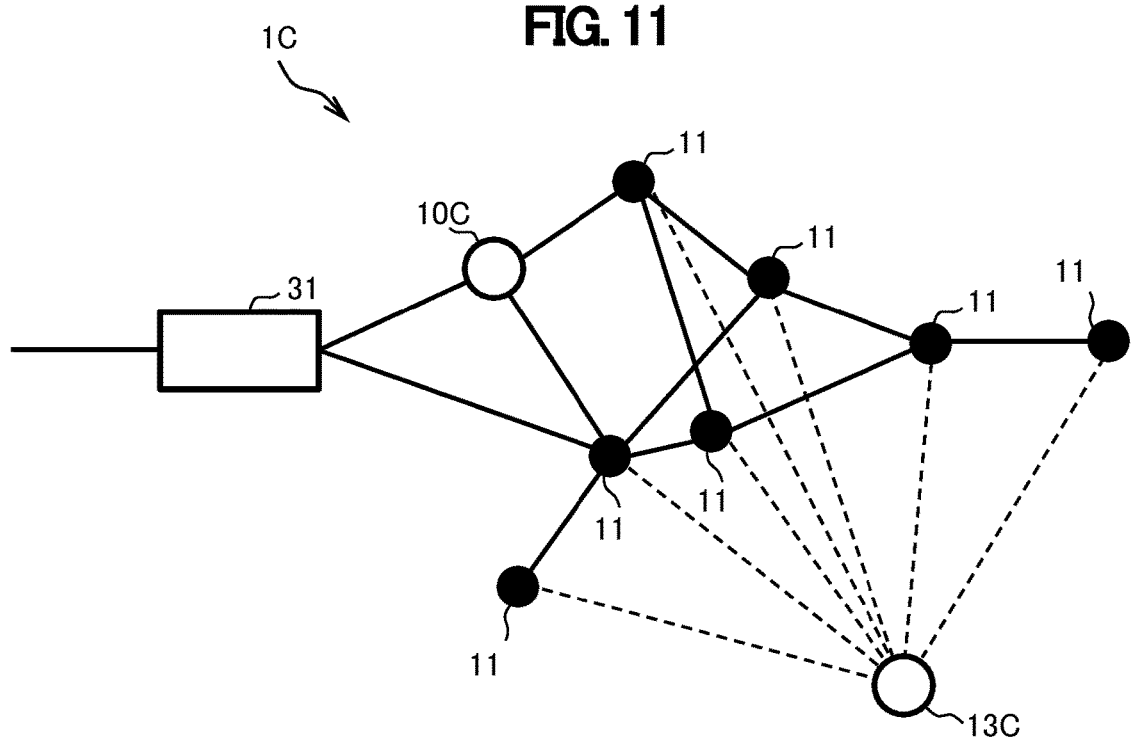
FIG. 11 is a diagram showing another configuration of a time synchronization network according to the third embodiment.

In the time synchronization network 1C of FIG. 9, one of communication devices 11 is set as the reference communication device 13, with said one being any one of the communication devices 11. The present embodiment is, however, not limited to this. As shown in FIG. 11, the time synchronization network 1C may include a standard time estimation device 13C that is independent of the communication device 11. The standard time estimation device 13C includes a standard time estimation unit 113 that is similar to that shown in FIG. 10 and can estimate standard time. In this case, the communication device 11 may correct the time information using standard time that is estimated by the standard time estimation device 13C.

The time synchronization network 1C may be applied not only to the first embodiment but also to the second embodiment.

Modifications

Although embodiments of the invention have been described above in detail, the invention is not limited to the above-described embodiments. An embodiment may include design changes or the like that are within a range not departing from the gist of the invention.

Figure 12:
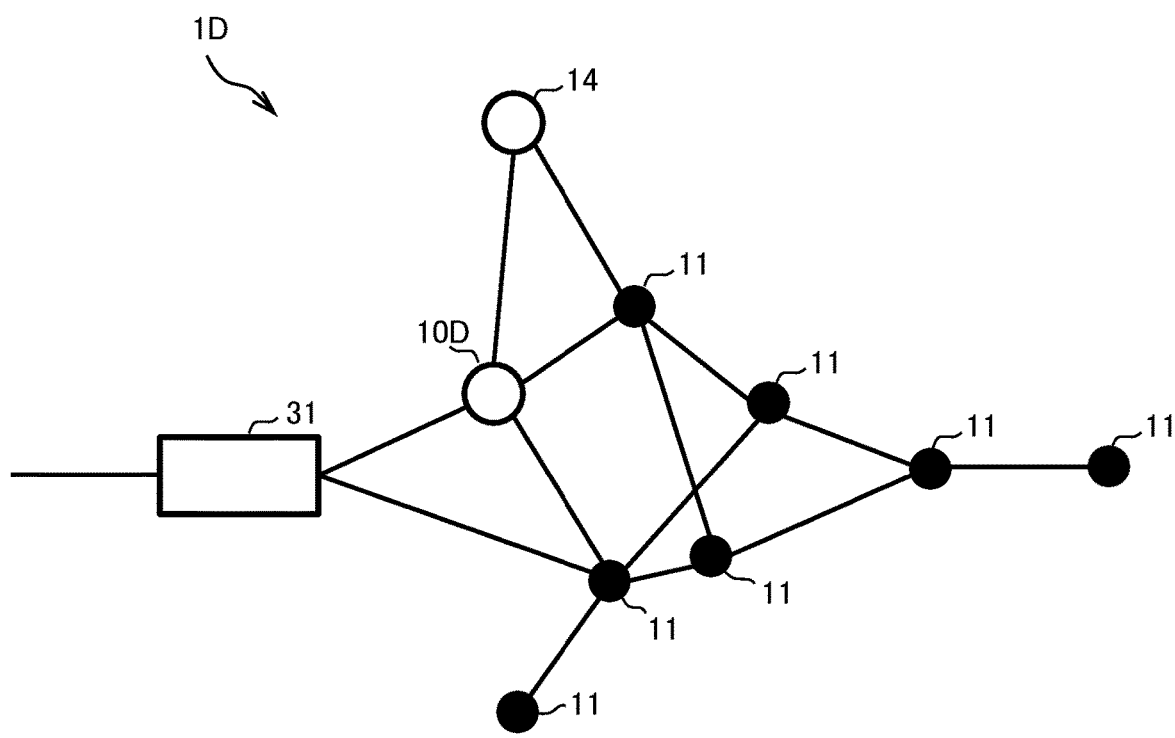
FIG. 12 is a diagram showing a configuration of a time synchronization network according to a modification.

Although in the above-described first embodiment, the edge server has been described as including a function of the time server, the invention is not limited to this configuration. As shown in FIG. 12, a time synchronous network 1D may include a time server 14 that is independent of an edge server 10D. In this case, the time server 14 provides standard time to an adjacent communication device 11.

Although a range of the time synchronization network (a local network) is not defined in the above-described embodiments, the range of the local network may be set in advance according to a domain. Alternatively, the range of the local network may be set autonomously in accordance with a response time of a beacon.

Aspects of the Disclosure

One or more aspects of the invention are directed to a time synchronization network that is capable of efficiently maintaining time synchronization according to standard time.

A time synchronization network according to an embodiment of the disclosure is capable of suppressing communication traffic and network delay and efficiently maintaining time synchronization according to standard time.

A time synchronization network according to a first aspect of the invention is a time synchronization network for performing time synchronization of a plurality of communication devices that are connected thereto. Each of the plurality of communication devices includes a communication function. Each communication device includes a time information output unit and a time synchronization unit. The time information output unit is configured to output time information with an internal clock that is stable. The time synchronization unit is configured to correct the time information based on time difference information on a time difference between the communication device and another communication device adjacent to the communication device.

According to such a configuration, the internal clock is stable. Because of the stable internal clock, it is possible to suppress frequency drift and, even when frequency drift does occur, maintain a constant drift rate.

Time information can therefore be corrected based on information on a time difference between communication devices that are adjacent to one another. Therefore, communication devices do not all have to connect to a time server. In this way, communication traffic and network delay can be suppressed, and time synchronization according to standard time can be maintained efficiently.

A time synchronization network according to a second aspect of the invention is configured so that the time information output unit includes an atomic clock or a crystal oscillator with a temperature-controlled chamber.

According to such a configuration, the internal clock is more stable and frequency drift can be suppressed significantly.

A time synchronization network according a third aspect of the invention is configured so that the communication device further includes a storage that is configured to store the time difference information, and the time synchronization unit is configured to correct the time information by offset processing that is based on the time difference information stored in the storage.

According to such a configuration, the time difference information is not obtained from outside the communication device, and communication traffic can be suppressed further.

A time synchronization network according to a fourth aspect of the invention further includes a memory server that is configured to store the time difference information of each communication device. According to the fourth aspect, the time synchronization unit is configured to correct the time information by offset processing that is based on the time difference information stored in the memory server.

According to such a configuration, each communication device does not store time difference information therein. Thus, a configuration of the communication device can be simplified and time difference information can be managed easily.

A time synchronization network according to a fifth aspect of the invention further includes a time server configured to provide standard time. According to the fifth aspect, the time synchronization unit of a communication device adjacent to the time server is configured to correct the time information by offset processing that is based on time difference information on a time difference between the communication device and the time server.

According to such a configuration, time synchronization is performed accurately based on standard time provided by the time server.

A time synchronization network according to a sixth aspect of the invention further includes a standard time estimation device. According to the sixth aspect, the standard time estimation device includes a standard time estimation unit that is configured to estimate standard time through statistical processing of the time difference information. According to the sixth aspect, the time synchronization unit is configured to correct the time information by offset processing that is based on time difference information on a time difference between the communication device and the standard time estimation device.

According to such a configuration, even when a time server is not included in the time synchronization network, time synchronization is performed accurately based on standard time that is estimated by the standard time estimation device.

REFERENCE SIGNS LIST

NW Network
1, 1B, 1C, 1D time synchronization network
2 Core network
3 Infrastructure network
10, 10C Edge server
11, 11B Communication device
12 Memory server
13 Reference communication device (standard time estimation device)
13C Standard time estimation device
14 Time server
30 Base station (parent-station device)
31 Base station (slave-station device)
32 Repeater (relay device)
100 Communication module
110, 110B, 110C Computing unit
111, 111B Time synchronization unit
112 Memory (storage)
113 Standard time estimation unit
120 Time information output unit
121 Internal clock
122 Counter
130 GNSS

What is claimed is:

1. A time synchronization network for performing time synchronization of a plurality of communication devices that are connected thereto, each of the plurality of communication devices including a communication function,
wherein the time synchronization network includes:
a standard time estimation device that is one of the plurality of communication devices; and
second communication devices that are the remaining plurality of communications devices,
wherein each of the plurality of communication devices includes a time information output unit configured to output time information with an internal clock, the time information output unit including an atomic clock or a crystal oscillator with a temperature-controlled chamber that stabilizes the internal clock by reducing frequency drift or maintaining a drift rate at a constant level,
wherein each second communication further includes:
a first hardware processor configured to correct the time information of the second communication device based on time difference information on a time difference between the second communication device and another communication device that is one link away, the other communication device being the standard time estimation device or another second communication device; and
a storage configured to store the time difference information, and
wherein the standard time estimation device includes a second hardware processor configured to:
obtain the time difference information from the second communication devices; and
estimate a standard time by performing a maximum likelihood estimation process using a Kalman filter on the time difference information of the second communication devices.

* * * * *